(12) United States Patent
Breidenbach et al.

(10) Patent No.: US 12,074,853 B1
(45) Date of Patent: Aug. 27, 2024

(54) METHOD AND APPARATUS FOR PROVIDING SECURE INFORMATION TO A DECENTRALIZED COMPUTING ENVIRONMENT

(71) Applicant: SmartContract Chainlink Limited SEZC, Grand Cayman (KY)

(72) Inventors: Lorenz Breidenbach, Grand Cayman (KY); Alex Coventry, Grand Cayman (KY); Ari Juels, Grand Cayman (KY); Christian Cachin, Grand Cayman (KY)

(73) Assignee: SmartContract Chainlink Limited SEZC, Grand Cayman (KY)

(*) Notice: Subject to any disclaimer, the term of this patent is extended or adjusted under 35 U.S.C. 154(b) by 372 days.

(21) Appl. No.: 17/678,769

(22) Filed: Feb. 23, 2022

Related U.S. Application Data (60) Provisional application No. 63/152,804, filed on Feb. 23, 2021.

(51) Int. Cl.
| | | |
|---|---|---|
| *G06F 16/00* | (2019.01) | |
| *G06F 16/2458* | (2019.01) | |
| *G06F 16/248* | (2019.01) | |
| *G06F 16/27* | (2019.01) | |
| *H04L 9/40* | (2022.01) | |

(52) U.S. Cl.
CPC ...... *H04L 63/0428* (2013.01); *G06F 16/2471* (2019.01); *G06F 16/248* (2019.01); *G06F 16/27* (2019.01)

(58) Field of Classification Search
CPC ............ H04L 63/0428; G06F 16/2471; G06F 16/248; G06F 16/27
See application file for complete search history.

(56) References Cited

U.S. PATENT DOCUMENTS

| | | | |
|---|---|---|---|
| 2020/0074552 A1* | 3/2020 | Shier | G06Q 20/10 |
| 2020/0311312 A1* | 10/2020 | Yu | H04L 9/0897 |

OTHER PUBLICATIONS

Berger et al.,"OraclesLink: An architecture for secure oracle usage", IEEE,978-1-7281-8370,pp. 66-72 (Year: 2020).*

* cited by examiner

*Primary Examiner* — Alexander Khong
(74) *Attorney, Agent, or Firm* — Rimon PC; Marc S. Kaufman (57) ABSTRACT

A system and method in which a network of offchain oracle nodes are used to provide dynamic information to consuming smart contracts in a decentralized computing environment. The off-chain oracle network and a corresponding protocol reduces the likelihood of damage from rogue oracles acting in concert. Periodically, the oracle nodes, jointly and in concert, run the protocol to sign a report containing observations from many of the oracles in the network. The report is transmitted to a smart contract C running on a DLT. The smart contract C can validate the report, pay each oracle node that contributed an observation to the report and expose the median, or other calculated value, of the reported values to the on-chain consuming smart contracts.

18 Claims, 3 Drawing Sheets

METHOD AND APPARATUS FOR PROVIDING SECURE INFORMATION TO A DECENTRALIZED COMPUTING ENVIRONMENT

RELATED APPLICATION DATA

This application is a non-provisional application of provisional application Ser. No. 63/152,804, the entire disclosure of which is incorporated herein by reference.

BACKGROUND

Decentralized computing environments, also known as "Distributed Ledger Technology (DLT), refer to computer networks in which computing devices communicate in a peer-to-peer manner without the need for centralized control. Generally, decentralized computing environments store data on multiple distributed ledger nodes in accordance with a "consensus mechanism" which is used to determine which data can be stored on the ledgers. Because consensus is required, decentralized computing environments can store data accurately and securely without the need for a centralized database controlled by a trusted party.

Distributed ledger technology has been deployed in recent years to provide "trustless" transactions between parties. In other words, DLT allows parties who do not have a trust relationship, or possibly even know each other's identity, to exchange information and conduct various transactions in an accurate manner. This is accomplished because DLT systems record information on a shared ledger, i.e. individual ledgers in the nodes, in a manner that makes it very difficult to change, hack, or cheat the system.

A blockchain is a type of DLT and is essentially a digital ledger of transactions that stores groups of transaction data in blocks. Each block of data contains a record of multiple transactions, and every valid transaction that occurs on the blockchain, is added to a block that is recorded on the nodes. Each block is linked to previous blocks through cryptographic techniques. There are many blockchain protocols, including Bitcoin, Ethereum, Hyperledger, R3 Corda, Quorum, and Cardano.

Executable code, referred to as "smart contracts" can be stored in a DLT system, i.e., "on-chain" in an immutable manner, similar to the manner in which transaction data is stored. This allows smart contracts to provide trustless execution of various functions in an automated manner. However, to be pragmatic, smart contracts often need to receive dynamic data that is not stored on the DLT, i.e., data stored "offchain", such as pricing information and weather information. This data is received from trusted sources of data called "oracles."

For example, a crop insurance policy can be executed by a smart contract to automatically make a payment to any policy holder when precipitation in a specific geographic region is less than a predetermined amount over a specified time. The amount of precipitation can be received from an oracle. Of course, the oracle must be accurate and trusted by the insurer and all insured parties for this insurance to be effective. However, in conventional systems, the need to trust the accuracy of oracles often defeats much of the purpose (e.g., trustless transactions) of DLT systems. The CHAINLINK™ protocol provides a decentralized oracle network that results in reliable, tamper-proof inputs and outputs for complex smart contracts on any blockchain or other DLT system. This has largely solved the "trust problem" of conventional oracles. However, it is still possible that one or more rogue oracles could provide false results, e.g., in what is known as a "Byzantine" attack, to provide inaccurate information to a smart contract to causes the smart contract to act in an undesirable manner.

BRIEF SUMMARY

Disclosed implementations leverage an "off-chain" (i.e., not on the DLT on which the relevant smart contract is executed) oracle protocol to reduce the likelihood of damage from rogue oracles acting in concert. In disclosed implementations, there are n oracles (or nodes) that monitor an off-chain data stream. A typical example of such a data stream is an API reporting a price feed such as a conversions rate between ETH-USD. Periodically, the oracles, jointly and in concert, run the protocol to sign a report containing observations from many of the n oracles. Once a report is produced successfully, one or multiple transmitters sampled from the oracle set transmit the report to a smart contract C running on a "main" (e.g., a blockchain such as o be Ethereum). While the example of an Ethereum blockchain is discussed herein, no specific features of Ethereum are necessarily used by the off-chain reporting protocol and thus the protocol can be used in connection with any decentralized environment. The smart contract C can validate the report, pay each oracle that contributed an observation to the report (e.g., through an onchain transaction), and expose the median, or other calculated value, of the reported values to consuming smart contracts on-chain. The first transmitter to successfully transmit the report to C can be paid a bonus to make up for the transaction fees, such as Ethereum "gas" fees, incurred during transmission of the report.

The disclosed implementations include a protocol that is resilient to different kinds of failures. Oracles may become Byzantine out of malice or due to buggy code. The chosen security model limits only the number of faulty oracles. In practice, crash failures occur much more often. For example, networks go down or exhibit erratic behavior, data centers lose power, or software crashes upon attempting to dereference a nil pointer. In any case, an otherwise correct oracle or its network may be temporarily disrupted. When the oracle recovers and starts acting correctly again, it can rejoin the protocol quickly and without manual intervention. Additional measures are in place to mitigate such intermittent crash failures.

The disclosed implementations utilize design parameters that permit simple implementation. Communication between the oracles and computation performed by the oracles happens off-chain and thus can be (almost) free of network transaction costs. In contrast, communication with the smart contract C could require hefty fees depending on the on-chain environment. The disclosed implementations minimize transaction fees, by moving as much computation as possible off-chain.

Disclosed implementations minimize the time between the initiation of the signing protocol and the inclusion of the resulting transaction on the blockchain by smart contract C. For example, the data posted to C is for a decentralized finance (DeFi) trading platform, the data must be current. Assuming real-world internet latencies, the protocol should produce a report within a few seconds. Typically, this time will be dominated by the time it takes to complete transmission of the resulting report to smart contract C.

One disclosed implementation is a method for providing secure information to a decentralized computing environment, the method comprising executing a smart contract on plural on-chain nodes of the decentralized computing environment, wherein the smart contract specifies a network of plural oracle nodes of an off-chain computing network and wherein the oracle nodes each have a collection of keys that define an identity of the corresponding node; periodically receiving, by each oracle node, a respective value corresponding to the secure information; wherein the oracle nodes communicate with each other and with the smart contract using a protocol that defines the following three protocol modules;

a report generation module configured to gather the respective signed values from each oracle node and, when specified security conditions are met, generate a signed report listing the respective values;

a pacemaker module configured to periodically initiate a new epoch that triggers an instance of the report generation module; and     a transmission module configured to selectively transmit, to the smart contract, the signed report generated by each of multiple instances the report generation module, wherein signed reports to be transmitted are selected based on timing of the generation of the reports and a state of the smart contract; and         determining, by the smart contract, a mathematical aggregation of the values in each report transmitted in accordance with the transmission; and exposing by the smart contract, the aggregation of the values to consuming smart contracts executing on the decentralized computing environment.

Another disclosed implementation is a computing system for providing secure information to a decentralized computing environment, the system comprising a plurality of computer processors and at least one memory coupled to the computing processors and storing computer-readable instructions which, when executed by the plurality of computing processors, causes the plurality of computing processors to accomplish the following steps; executing a smart contract on plural on-chain nodes of the decentralized computing environment, wherein the smart contract specifies a network of plural oracle nodes of an off-chain computing network and wherein the oracle nodes each have a collection of keys that define an identity of the corresponding node; periodically receiving, by each oracle node, a respective value corresponding to the secure information; wherein the oracle nodes communicate with each other and with the smart contract using a protocol that defines the following three protocol modules;

a report generation module configured to gather the respective signed values from each oracle node and, when specified security conditions are met, generate a signed report listing the respective values;

a pacemaker module configured to periodically initiate a new epoch that triggers an instance of the report generation module; and     a transmission module configured to selectively transmit, to the smart contract, the signed report generated by each of multiple instances the report generation module, wherein signed reports to be transmitted are selected based on timing of the generation of the reports and a state of the smart contract; and         determining, by the smart contract, a mathematical aggregation of the values in each report transmitted in accordance with the transmission; and exposing by the smart contract, the aggregation of the values to consuming smart contracts executing on the decentralized computing environment.

BRIEF DESCRIPTION OF THE DRAWING

The foregoing summary, as well as the following detailed description of the invention, will be better understood when read in conjunction with the appended drawing. For the purpose of illustrating the invention, the drawing shows various illustrative embodiments. It should be understood, however, that the invention is not limited to the precise arrangements and instrumentalities shown. In the drawings:

FIGS. 2a and 2b are a schematic representation of execution of the report generation protocol in which FIG. 2b is a continuation of the illustration of workflow from FIG. 2a.

DETAILED DESCRIPTION

Certain terminology is used in the following description for convenience only and is not limiting. Unless specifically set forth herein, the terms "a," "an" and "the" are not limited to one element but instead should be read as meaning "at least one." The terminology includes the words noted above, derivatives thereof and words of similar import.

Figure 1:
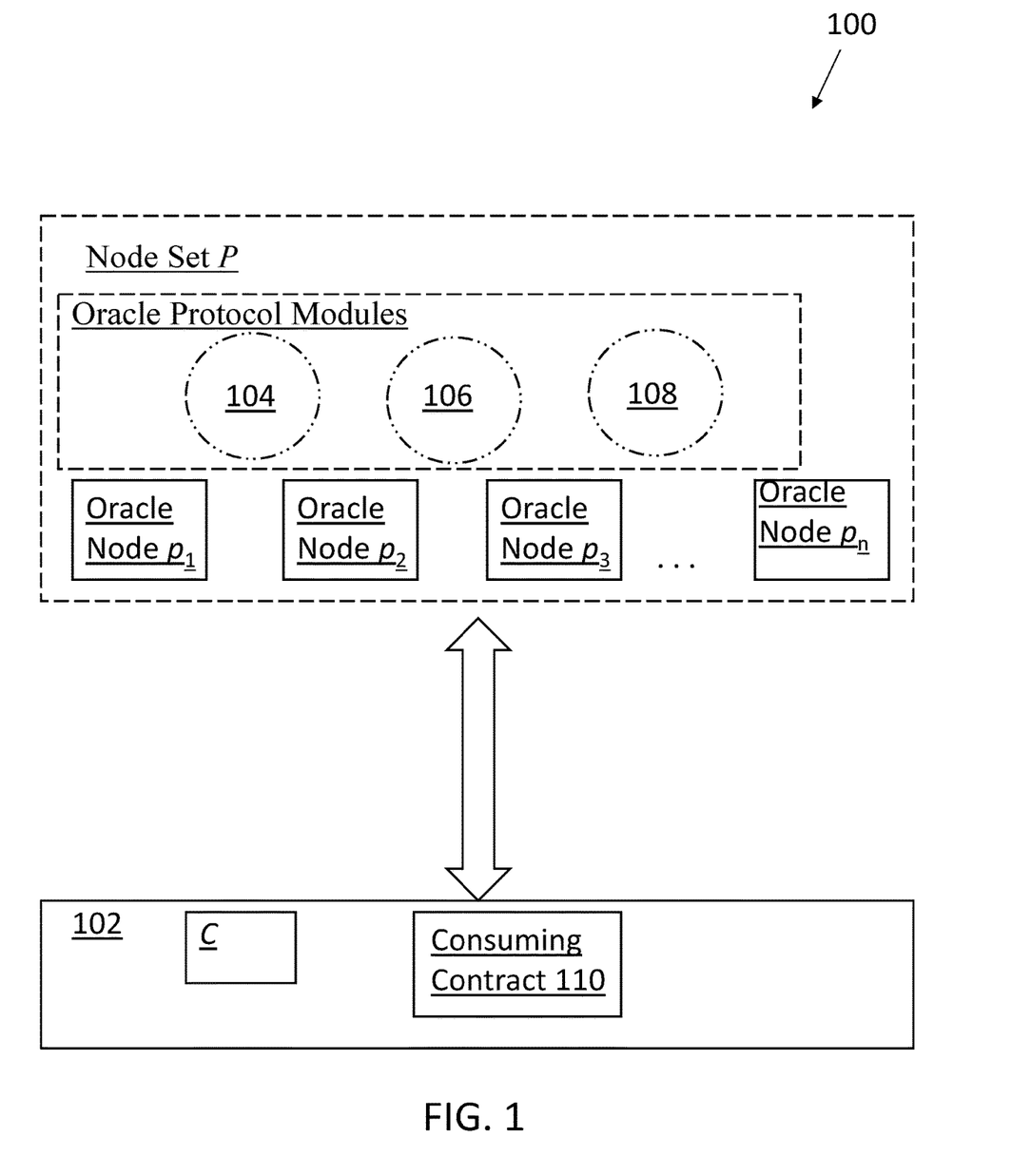
FIG. 1 is a schematic block diagram of a computing system in accordance with disclosed implementations

FIG. 1 illustrates a computer system 100 in accordance with disclosed implementations. The system consists of n oracles P={$p_1, \ldots, p_n$}. Each of $p_1, \ldots, p_n$ are also referred to as "nodes" herein. The oracles may send messages to each other over an off-chain network using the oracle protocol described below. Each node can be identified by their network endpoints, e.g., a certificate on their cryptographic key material, which allows the nodes to authenticate to each other. The set P of oracles is determined by an oracle smart contract C recorded and executable on a decentralized environment, such as blockchain 102 in FIG. 1. If it becomes necessary to change the oracle set that performs reporting, an oracle list in smart C contract can changed by its owner and the off-chain oracle protocol can be restarted with the new set of oracles. Smart contract C is described in greater detail below.

Each oracle $p_i$ makes observations of a value, such as a price, over time. The value can be read periodically or constantly. The oracle protocol and its security analysis do not rely on any specific structure or distribution over these observations. However, the oracle protocol ensures that the on-chain reports include the real observations of sufficiently many correct parties. Such reports, and how they are generated using the protocol, are described in greater detail below.

Any f<n/3 oracles may exhibit Byzantine faults, which means that they may behave arbitrarily and as if controlled by an imaginary adversary. All non-faulty oracles are referred to herein as "honest" or "correct." Consequently, for n≤3, all oracles most be correct for the protocol to function correctly. For stating formal security guarantees, faults may occur adaptively, where the adversary can choose the faulty nodes on the fly. In disclosed implementations, once faulty, a node remains faulty for the entire duration of the protocol. It is expected that the protocol operates usually with at least n=3f+1 since this provides optimal resilience. This failure assumption also covers network failures and crashes, which may or may not be introduced in a nefarious manner. This assumption also means that no more than f nodes may become isolated from the network or crash.

However, transient "benign" faults are permitted. For example, a correct node may crash and become unresponsive for a period of time, or it may become unreachable from some or all other correct nodes (such as during a network partition). When the correct node resumes operation after recovering, it restores some state from local persistent storage and will participate in the protocol again correctly. The model implemented by the oracle protocol achieves the following. If f oracles are Byzantine-faulty and c oracles are benign-faulty with f<n/3 but f+c≥n/3 at any point in time during the protocol execution, then: (a) the protocol may lose liveness, but (b) the protocol satisfies the safety properties. For supporting this refined model and thereby increasing the resilience against crashes, some local state of each oracle p is always maintained on persistent storage.

The goal of the oracle protocol of disclosed implementations is to repeatedly produce reports which are recorded by the smart contract C on the DLT, such as blockchain 102 (which can be an Ethereum blockchain). A report is signed by a sufficient number of oracles and can consist of a sorted list with recent observed values from a plurality of oracles along with cryptographic signatures of the oracles. The report is submitted to C. The code of C, in turn, verifies the signatures of the oracles, checks that the list of observations is sorted, records which oracles contributed, and calculates an aggregation of the observations. The aggregation can be, for example, a median of the values in the report. The aggregation is stored as the reported value on the blockchain. While the median of the observations is used in this example, any other statistical value that represents the collective value of the observations can be used, along with any appropriate weighting or other processing, as the aggregation. The oracles contributing to the report can receive a payout. Using the median among more than 2f observations as the aggregation ensures that the reported value is plausible in the sense that faulty oracles cannot move it outside the range of observations submitted by correct oracles.

Under the assumption that the protocol is run by n>3f oracles, the maximum resilience is achieved when n=3f+1. When n>>3f, i.e., when the owner of C assumes fewer than the maximally possible number of oracles would misbehave, then multiple options arise for the number $\lambda$ of observations that constitute a report:

(a) Setting $\lambda=2f+1$ takes only the minimally needed number of observation values into a report for the median to be plausible and results in the lowest payout. This choice is correct under the assumption that no more than f oracles report wrong observations. However, this choice does not gracefully degrade when n>>3f and the assumption on f is violated.

(b) With $\lambda>(n+f)/2$ observations, the coverage of the observations included in a report among those made by all oracles is broader than in option (a). In particular, this choice of $\lambda$, which corresponds to the size of a Byzantine quorum, ensures that for every two reports, there is least one correct oracle that contributed an observation to both.

(c) Using $\lambda=n-f$ observations ensures that reports are produced always by as many oracles as possible and that no correct oracle is left behind. This means that the reported value is determined from the largest number of measured data values and gives the correct oracles the biggest chance to contribute, compared to the other options. The cost arising is also the largest because n−f oracles receive payout.

Due to the number of observations that must be included in a report, with average network behavior, option (a) performs best, option (b) follows but takes longer, and option (c) results in the slowest performance because it must wait for the largest number of messages. Hence, the choice of represents a tradeoff between the total cost of the payouts, the performance of the protocol that collects the observations, and the robustness of the reported value. The example of the report generation protocol of the disclosed implementations uses option (a) with $\lambda=2f+1$. In practice, adhering to n=3f+1 tolerates the maximum number of faulty oracles and obviates the need for choosing between options (a)-(c) because they all reduce to $\lambda=2f+1$.

In accordance with disclosed embodiments, the oracle protocol can use public-key digital signatures and pseudo-random functions (PRF). The standard ECDSA scheme can be used for digital signatures. A PRF may be implemented by HMACSHA256 or by Keccak256 (e.g., by simply prepending the key to the message). The timing of the network model can be aligned with a partially synchronous model (such as DLS88). To defend against distributed denial of service (DDoS) attacks by outside entities, the oracles can communicate over a private computer network. "Partial synchrony" as used herein, means that the network is asynchronous, and the clocks of the nodes (oracles) are not synchronized up to some point in time called "global stabilization time" (GST). After GST, the network behaves synchronously, the clocks behave synchronously, and all messages between correct nodes are delivered within some bounded delay $\Delta$, and this remains so for the remainder of the protocol instance execution. In practice, a protocol may alternate multiple times between asynchronous and synchronous periods. Liveness is only ensured for periods of synchrony.

As a pragmatic choice, the maximal communication delay $\Delta$ can be a constant configured into the protocol. A discussion of the timeout values used in some implementations is set forth below. The oracles may send point-to-point messages to each other over an unreliable network. All connections are authenticated and encrypted. In other words, each oracle can authenticate every other oracle based on the list of oracles as determined by C on blockchain 102. Messages sent between correct oracles are not necessarily delivered in the same order in which they were sent.

As noted above, it is possible for a network partition to temporarily isolate a large number of nodes. Such partitions can model node crashes and eventual reboots, as well. However, since nodes keep retrying messages, all messages among correct nodes get through eventually, once any impeding network asynchrony passes.

As noted above, oracle reports are periodically sent to contract C. The oracle protocol can be structured into three protocols, called "pacemaker" (implemented by pacemaker module 104), "report generation" (implemented by report generation module 106), and "transmission", (implemented by transmission module 108). Note that modules 104, 106, and 108 are illustrated schematically in FIG. 1 and are shown as residing external to nodes $p_1$ to $p_n$. However, as will be described below. The function of the modules can be implemented by the nodes collectively and in concert. The term "module", as used herein, refers to software executing (or executable) on computer hardware to accomplish the described functions.

Pacemaker module 104 drives timing of the report generation process, which is structured into epochs. In each epoch, there is a designated leader oracle that drives a report generation protocol for the epoch. This concept is similar to some protocols for consensus. However, the pacemaker protocol described herein does not ensure consensus and relies on smart contract C for resolving ambiguities that may occur due to transitions across epochs.

Figure 2A:
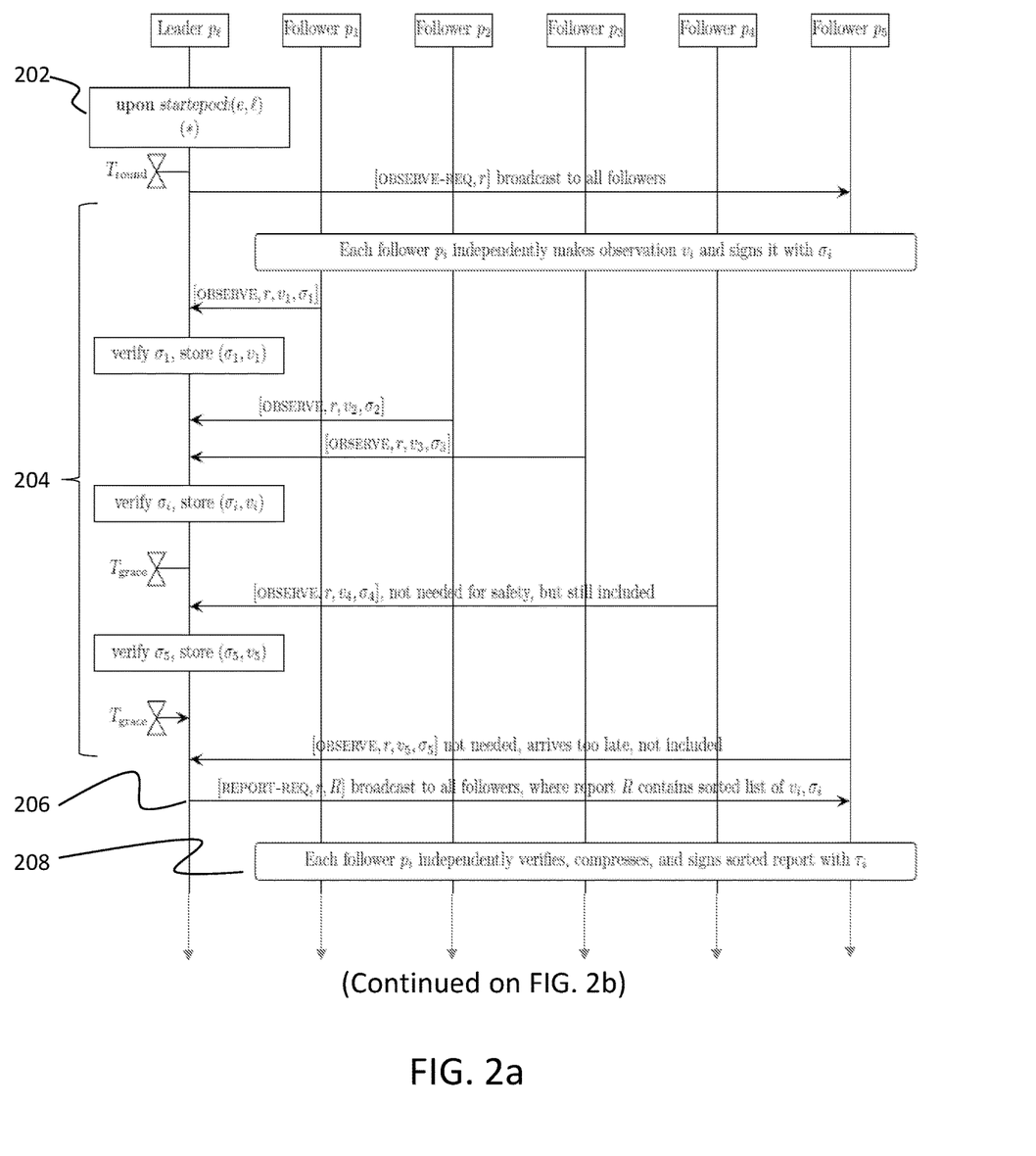
Figure 2B:
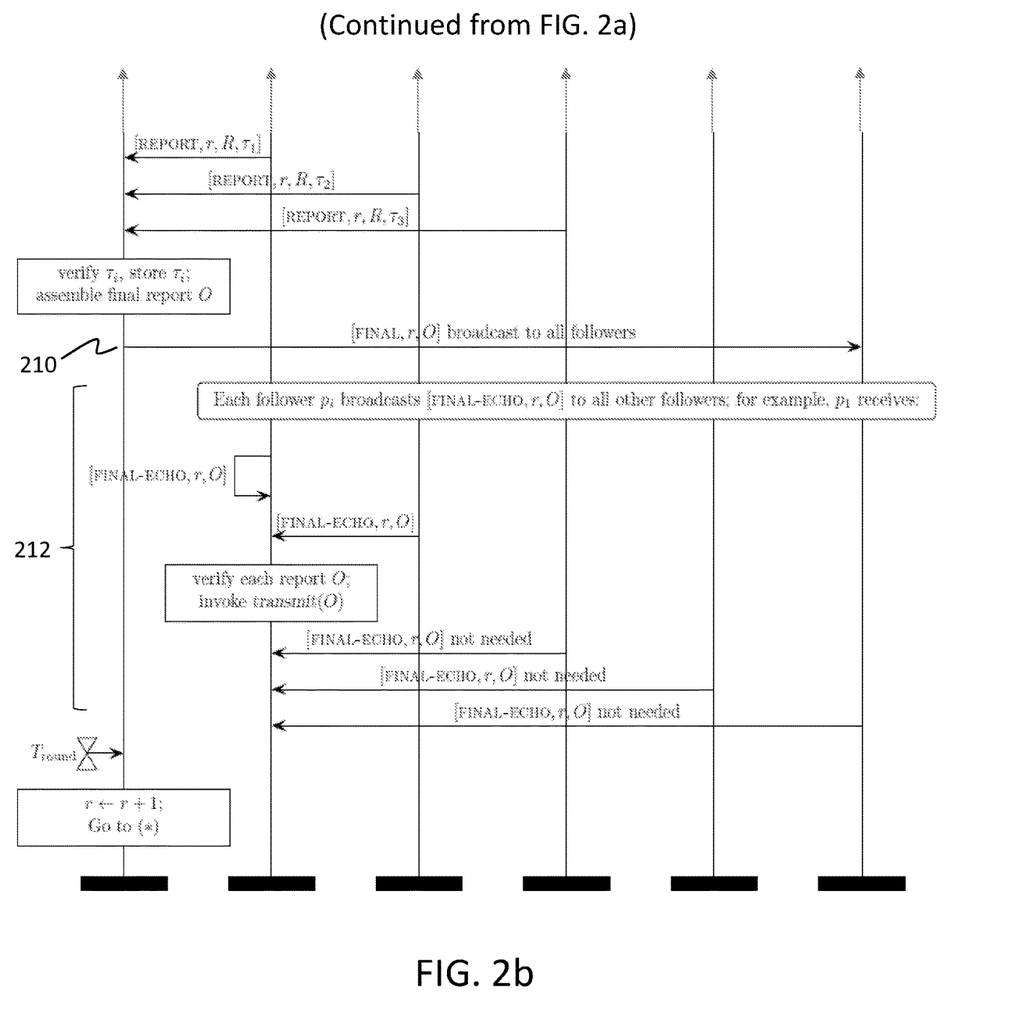

FIGS. 2 and 2a illustrate the data flow accomplished by the protocol of pacemaker module 104 and report generation module 106. Pacemaker module 104 periodically initiates a new epoch and a corresponding instance of the report generation protocol. Every report generation instance has a designated leader. At 202 of FIG. 2a, pacemaker module 104 emits a startepoch event that is sent to a leader oracle node $p_l$ (selected from amongst oracle $p_1 \ldots p_n$), which triggers the leader oracle node to start a "round" of the report generation protocol.

Rounds and leader selection are discussed in detail below. Every report generation protocol instance executed by report generation module 106 corresponds to an epoch and has a unique identifier e and a leader node $p_l$. A new epoch can be started whenever a sufficient predetermined number of oracles have determined that a new leader is needed. The report generation protocol of an epoch is structured into rounds. In each round, the protocol gathers observations and, if conditions for proceeding are met, the protocol generates a signed oracle report.

Pacemaker module 104 may also abort the currently running report generation instance if it does not observe enough progress. To this end, pacemaker module 104 receives progress events from the current report generation instance. Every oracle runs a timer with timeout duration $\Delta_{progress}$ that serves to watch the epoch leader's performance and every progress event resets that timer. When the timer expires, the oracle concludes that the current leader was not performing correctly and has not produced a valid report that may be sent to smart contract C. The oracle then moves to initiate a new epoch with another report generation protocol instance and a different leader. Neither pacemaker module 104 nor report generation module 106 actually sends out the report to smart contract C. This task is accomplished by transmission module 108 as described below.

At 204 of FIG. 2a pacemaker module 104 observes the progress only via the report generation instance through the progress events. Thus, $\Delta_{progress}$ need not depend on the worst-case transaction confirmation time on blockchain 102. Pacemaker module 104 also responds to changeleader events originating from a report generation instance. This event indicates that the instance and its leader have run for the maximum permitted duration and that its epoch ends. When this occurs, pacemaker module 104 also aborts the current report generation instance and starts the next epoch, with a new report-generation instance and possibly a different leader.

The rounds are controlled by the leader node and by a timeout $\Delta_{round}$. This timeout, which is only triggered by the leader, controls the frequency of rounds and of gathering observations. The value of $\Delta_{round}$ must be lower than $\Delta_{progress}$ and larger than the network latency required to complete a full iteration of the report generation protocol during periods of synchrony, plus a safety margin.

Once a sufficient number of observations are collected together into the more compact form of a report, the report is ready for being sent to smart contract C by transmission module 108. The report contains enough signatures of the oracles for smart contract C to verify that the report is correct and valid. For preventing unnecessary reports, however, typically only the leader will generate such a report, and the oracles only participate in producing the report, under the following conditions: either their view of the data-stream value has changed by more than a fraction α compared to the most recent value reported by smart contract C or more than an interval $\Delta_C$ time has passed since that report.

The transmission protocol of transmission module 108 encapsulates the steps performed locally by each oracle for sending reports to smart contract C. Unlike the algorithms of pacemaker module 104 and report generation module 106, the protocol of transmission module 108 does not involve any communication among the oracles. Transmission module 108 delays reports pseudo-randomly to ensure a staged sending process, preventing a situation in which too many copies of the same report are sent simultaneously to smart contract C in fault-free cases. This saves cost because smart contract C may process all reports it receives, even when it does not include a report in the blockchain.

A semi-formal description of the oracle protocol, and its modules, can be created using an event-based notation, as used in the standard literature. See, for example, Christian Cachin, Rachid Guerraoui, and Luís E. T. Rodrigues. *Introduction to Reliable and Secure Distributed Programming* (2. ed.) Springer, 2011. ISBN: 978-3-642-15259-7. DOI: 10.1007/978-3-642-15260-3. A protocol is written in terms of a list of upon-handlers, which may respond to events or to conditions on the protocol's internal state. Handlers are executed atomically, i.e., in a serializable and mutually exclusive way, per protocol instance and per node such that no two handler executions of the same instance interleave. A protocol instance (i.e., an instance of Algorithm 1, Algorithms 2-4 or Algorithm 5 below) communicates with other instances running on the same oracle through events, which are triggered by invoke event (e.g. in the form of example-event(arg1, arg2)). For each triggered event, a handler of the form upon event example-event(arg1, arg2) do is executed once.

Events between two protocol instances executing on the same node can be handled in the same order in which they were triggered (i.e., FIFO order). The execution is otherwise asynchronous, which means that the invoking protocol may only obtain output from an invoked protocol instance via further events. Protocol instances communicate with peer instances running on different oracles by sending messages as send message [EXAMPLE-MESSAGE, arg1, arg2] to $p_j$. Messages also trigger events when they are received by the protocol on a destination node. Broadcasts can be used where an instance sends a message to all instances including itself:

send message [EXAMPLE-MESSAGE, arg1, arg2] to all $p_j \in P$

Every correct node continuously resends every message until the destination node acknowledges their receipt. However, a correct node does not further retransmit any message once its view of the current epoch (in Algorithm 1) or round (in Algorithms 2-4) has been incremented from the one to which a message pertains. Every receiving node acknowledges every message it receives, even if a message is a duplicate. Timers are created in a stopped state. After being started, a timer times out once and then stops. A timer can be (re)started arbitrarily many times. Restarting an already running timer is the same as stopping it and then starting it afresh. Stopping a timer is idempotent (i.e., denoting an element of a set which is unchanged in value when multiplied or otherwise operated on by itself).

The smart contract C can be managed by an owner with administrative powers. The owner can set future payment amounts and add or remove oracles. When the owner modifies the oracle set, an Ethereum log event is emitted by the contract informing the oracles about the new configuration of the off-chain network. The owner can be instantiated in various known ways. In practice, trust-minimization considerations would suggest using a contract that limits the power of malicious actors, for example, by requiring multiple signatures by independent parties or enforcing a waiting period before changes can be enacted.

Smart contract C records the reports, each of which contains a logical timestamp and multiple observation values. When C receives a transmission with report R with a more recent logical timestamp than the maximum smart contract C has seen, smart contract C updates its record with the median of all observation values in the report and exposes this to consuming contracts, such as consuming contract 110 on blockchain 102 of FIG. 1. For example, consuming contract 110 can be a contract executing a financial instrument, such as buying or selling of a derivative. In this example, the report could include price data for one or more underlying assets that define the derivative.

Transmissions with equal or smaller logical timestamp are ignored. Logical timestamps are implemented by epoch-round tuples (e,r), denoting the round r and the epoch and report-generation protocol instance e, in which the report was produced. Upon successful transmission of R, smart contract C can cause a payment to me made to each oracle that provided an observation to R and cause payment to the oracle that submitted R to compensate it for its transaction fee expenditure. Payment can be affected through blockchain 102 and can be made to cryptographic wallets associated with the oracle that is being paid.

As an example, an Ethereum implementation of C, written in Solidity, is set forth in the Code Appendix. In the example of the Ethereum contract, a transaction cost of ca. 291000 gas for 31 oracles was measured for the first transmission of a given epoch and round. Any subsequent transmission with the same epoch-round pair is ignored (technically, it aborts using Ethereum's revert) and costs ca. 42000 gas.

An example of a pacemaker protocol is provided in Algorithm 1 below. The algorithm is executed by pacemaker module 104 and governs the choice of a series of leaders associated with epochs numbered in succession 0, 1, 2, . . . . For each epoch, one instance of the report generation protocol in Algorithm 2-4 (also shown below and discussed in detail later) is created and executed. If this does not produce a valid report after $\Delta_{progress}$ units of time, the oracle initiates a switch to the next epoch, and the corresponding next leader. Algorithm 1 is similar to the leader-detection algorithm specified by Christian Cachin, Rachid Guerraoui, and Luís E. T. Rodrigues. *Introduction to Reliable and Secure Distributed Programming* (2. ed.) Springer, 2011. ISBN: 978-3-642-15259-7. DOI: 10.1007/978-3-642-15260-3. The algorithm disclosed herein is extended by means to tolerate lossy links, such that messages sent between correct oracles do not need to be buffered.

Every oracle $p_i$ maintains a local variable e, which denotes the epoch in which $p_i$ operates. Furthermore, as noted above, a variable l denotes the leader oracle $p_l$ of the current epoch, derived from e as l←leader(e). The variable ne tracks the highest epoch number the oracle has sent in a NEWEPOCH message. These variables are maintained on persistent storage. The node broadcasts a NEWEPOCH message containing ne every $\Delta_{resend}$ seconds. This increases the probability that relevant NEWEPOCH messages get through, even if a message is dropped at some point. It also helps for integrating crashed oracles back into the protocol after they have recovered. Incorrect behavior by the current leader p is determined by oracle $p_i$ if $p_i$ has not observed a valid final report by timeout $\Delta_{progress}$.

If an oracle receives more than f messages of the form [NEWEPOCH, e'], each one containing some e'>e, it infers that at least one correct node wishes to progress to some epoch higher than e. The node chooses this epoch $\bar{e}$ as the (f+1)-highest entry of newepoch and sends out its own [NEWEPOCH, $\bar{e}$] message. Since it is assumed that at most f nodes are Byzantine, receiving a message from more than f others implies that at least one correct node has earlier sent a [NEWEPOCH, $\bar{e}$] message. This protocol differs from the protocol in Cachin et al. at least in that $\bar{e}$ is an arbitrary future epoch, not necessarily the next epoch from the receiving oracle's perspective. This allows the oracle to catch up if it misses messages pertaining to an entire epoch or more. Recall that correct nodes may also exhibit benign faults and be offline for some time. If f is close to n/3, this doesn't matter too much, since the protocol will not actually advance unless approximately ⅔ of the nodes positively respond with NEWEPOCH messages. For smaller f, though, arbitrary delays could lead to multiple distinct perspectives on the current epoch.

The node continuously records the highest epoch numbers received from all others through NEWEPOCH messages. If a node observes that more than 2f nodes wish to change to an epoch greater than e, the node aborts the currently running report generation protocol instance, and switches to epoch $\bar{e}$, where $\bar{e}$ is the (2f+1) highest entry of newepoch. It also initializes the report generation protocol instance for. $\bar{e}$ Because more than 2f nodes indicated epoch $\bar{e}$ or greater, the node infers that more than f correct nodes wish to switch to a later epoch. This, in turn, implies that every correct node will receive more than f NEWEPOCH messages as well, since a correct node will send those messages to all other nodes. Hence, all correct nodes will eventually transmit a NEWEPOCH message containing epoch at least $\bar{e}$, according to the NEWEPOCH amplification rule, and initialize the report generation protocol for epoch $\bar{e}$.

At any time, some number c of nodes may exhibit benign faults and have crashed. If they eventually recover, they will resume operations (otherwise, they are considered as Byzantine). A crashed oracle will not rejoin Algorithm 2-4. In the following, assume that there are no simultaneous Byzantine faults and consider these scenarios:

c≤f: When no more than f oracles have crashed, the protocol maintains liveness and progresses normally (based on the assumption that there are no further Byzantine faults). When an oracle crashes in some epoch e, it misses all messages sent until it recovers. Upon recovery, it will eventually receive more than f NEWEPOCH messages containing an epoch larger than ne (recall that ne is restored from persistent storage upon recovery). This oracle will then rejoin the protocol by sending a NEWEPOCH message itself, denoting an epoch larger than ne.

c>f: During the time when more than f oracles have crashed, the protocol loses liveness. The protocol will resume operations successfully once n−f oracles are operating and more than f among them send a NEWEPOCH message with an epoch value of at least some e after recovery. This ensures that, eventually, more than f oracles send their own NEWEPOCH message with an epoch of at least and, in turn, all correct oracles announce epoch values e'≥e. This implies that the correct oracles eventually start epoch at least e.

Pacemaker module 104 is able to resume after a crash and subsequent recovery of any number of correct nodes. Note that the protocol ensures that for every correct oracle, the variable ne increases monotonically and, likewise, no entry in newepoch ever decreases. This follows directly from the protocol, e.g., for the assignments to ne that occur in the agreement rule, inside send-newepoch, from the way this function is called, and from the handling of received NEWEPOCH messages. Furthermore, note that ne≥e holds as well from the assignment to ne in the agreement rule and from the preceding reasoning. And since e is determined from the entries of newepoch that never decrease, also e increases monotonically.

Consider now a point in time when all correct nodes have recovered, there are Byzantine-faulty nodes, but the network timing has stabilized (i.e., a moment after GST). A stable situation also means that when a report generation protocol instance with a correct leader has been initialized by all correct oracles, this produces reports (and progress events) faster than $\Delta_{progress}$; hence, no correct oracle times out on $T_{progress}$ and initializes a further epoch like this.

Algorithm 1, which is discussed above, is set forth below.

state
  (e,l)←(0,leader(0)): current epoch and leader for $p_i$
  ne←e: highest epoch that $p_i$ has initialized or for that it has sent a NEWEPOCH message newepoch←[0]$^n$: highest epoch received from $p_j$ in a NEWEPOCH message timer $T_{progress}$ with timeout duration $\Delta_{progress}$// leader must produce reports with this frequency, or be removed timer $T_{resend}$ with timeout duration $\Delta_{resend}$// controls resending of NEWEPOCH messages
upon initialization do
  initialize instance (e,l) of report generation//see report generation protocol in Alg. 2-4 start timer $T_{progress}$
upon event progress do//the current leader is progressing with the report generation protocol (see Algorithm 2)
  restart timer $T_{progress}$
function send-newepoch($e^0$) send
  message [NEWEPOCH,$e^0$] to
  all $p_j \in P$ ne←$e^0$
  restart timer $T_{resend}$
upon event timeout from $T_{resend}$ do//resend NEWEPOCH message every $\Delta_{resend}$ seconds, in case network drops it
  send-newepoch(ne)
upon event timeout from $T_{progress}$ or event//leader is too slow, or tenure is over
  changeleader do stop timer $T_{progress}$
  send-newepoch(max{e+1,ne})
upon receiving a message [NEWEPOCH,$e^0$] from
  $p_j$ do newepoch[j]←max($e^0$,newepoch[j])
  upon |{$p_j \in P$|newepoch[j]≥ne}|>f do//NEWEPOCH amplification rule
  $\bar{e}$←max{e'||{$p_j \in P$|newepoch[j]≥e'}|>f}
  send-newepoch(max(ne,$e^-$))
upon |{$p_j \in P$|newepoch[j]>e}|>2f do//agreement rule
  $\bar{e}$←max{e'||{$p_j \in P$|newepoch[j]≥e'}|>f}
  abort instance (e,') of report generation
  (e,')←e, ⎯ leader($\bar{e}$))
  ne←max{ne,e}//see report generation protocol in
  initialize instance (e,') of Alg. 2-4
  report generation restart
  timer $T_{progress}$ if i=l then
    invoke event startepoch(e,')//see report generation leader
    protocol in Alg. 4

Correct oracles that have recovered may have missed arbitrarily many messages. Hence, their locally highest epochs (stored in ne) may vary widely. However, since all correct nodes resume the periodic transmission of NEWEPOCH messages, every correct node will soon receive n−f NEWEPOCH messages and determine an epoch number $\bar{e}$ in the NEWEPOCH amplification rule that is reported by more than f nodes. Notice that $\bar{e}$≥ne for the local variable ne of at least one correct node $p_j$. However, it may be that $\bar{e}$ is larger than the highest epoch for which any correct node has initialized the report generation protocol.

Let $p_s$ be some node with the (f+1)-largest value of the ne variables among the n−f correct nodes, and let $e_s$ denote this epoch number. According to the protocol, f+1 or more correct oracles will repeatedly send NEWEPOCH messages containing an epoch value of at least $e_s$. Since these messages are sent by correct oracles, every correct oracle will eventually have received at least f+1 such NEWEPOCH messages and send a NEWEPOCH message with parameter $e_s$ or higher as well. This implies that every correct oracle eventually stores n−f>2f entries in newepoch that are at least $e_s$. Hence, every correct oracle has either already initialized report generation protocol instance $e_s$ or will progress to epoch $e_s$ and initialize the report generation protocol instance $e_s$.

It can be shown that no correct oracle has yet aborted the report generation protocol instance $e_s$, by considering the monotonically increasing variables e and ne of each correct oracle. In order to progress to some epoch e'>$e_s$, a correct oracle would need more than 2f entries in newepoch containing e' or a higher value. Hence, accounting for f values reported by faulty oracles, more than f correct oracles would have sent NEWEPOCH messages containing e' or a larger value. However, the number of correct nodes whose ne variable may exceed $e_s$ and that might actually have sent NEWEPOCH messages with parameter larger than $e_s$ is at most f, according to the definition of $e_s$. This is a contradiction and shows that such an e' does not exist.

The function leader: N→{1, . . . , n} maps epochs to leaders. This function can be balanced so that, for any long interval of epochs, every oracle becomes leader approximately the same number of times. The function should bet be deterministic and computable by every oracle. The standard implementation is to set leader(e)=(e mod n)+1. The ordering of the oracles is determined by the list in smart contract C. If this order may be influenced by the oracles (for example, when ordered by their identifying public keys), this may provide an opportunity for a coalition of faulty oracles to arrange themselves consecutively, which could lead to long delays between correct operations of the protocol.

However, a pseudo-random function for selecting a leader can be used to avoid this risk. This has the advantage that the leader sequence remains unpredictable to any observer outside the set of oracles, ensuring that an external adversary cannot predict and attack the leader of a particular future epoch. This can be implemented with a cryptographic pseudo-random function $F_x$: {0, 1}*→{0, 1}$^k$, where x is a secret key (called the "seed") and that maps an arbitrary-length input string to a fixed-length, k-bit output string that looks random to anyone who does not know the secret key.

Interpreting k-bit strings as integers, one may then set leader(e)=($F_x$(e) mod n)+1. The seed is specified by the operator at startup of the protocol; it must be the same for all oracles. The leader function may be adjusted so that no oracle is selected as leader in two consecutive epochs by changing the modulus to n−1 and renumbering the oracles to exclude the current leader.

Algorithms 2-4, below, govern the current leader oracle's coordination of the current round's oracle observations and signatures, assuming the leader is correct. All its messages are tagged implicitly by the epoch identifier (e,l) and explicitly contain the round number (r). Notice this is one logical algorithm with two entirely separate parts, where Algorithms 2 and 3 contain code executed by all oracles including the leader p' and Algorithm 4 contains code executed only by $p_l$. This means the rules on atomic invocation of clauses hold across the whole report generation algorithm. All oracles start executing the protocol upon being initialized. The leader additionally receives a startepoch event, which actually triggers the message flow. The report generation protocol is only live when the leader is correct and may halt otherwise. The protocol executes a number of rounds and produces one report per round. After a predetermined number of rounds, it halts and signals to the pacemaker that it is time to kick off the next report generation protocol instance.

A new round is started every $\Delta_{round}$ units of time. The leader then sends first an OBSERVE-REQ message to all oracles. Oracles receiving an OBSERVE-REQ for round r from the leader move to round r, collect a new observation, sign it along with replay-prevention metadata, and send it back to the leader in an OBSERVE message. Once the leader has 2f+1 valid OBSERVE messages for round r, the leader waits out a grace period of duration $\Delta_{grace}$ so that delayed observations may also be included in the report. (Oracles are paid for their observations, and we don't want to withhold payment from oracles that are slightly delayed, e.g. because the API they're querying is slow. This also provides an incentive for oracles to participate in a speedy manner.) When the grace period expires, the leader collates the observations, sorts them by observation value, and sends them to all oracles in a REPORT-REQ message, as shown at 206 of FIG. 2a. The oracles check whether the report should be assembled (as explained in detail later), extract a compressed report containing just the observations and oracle identities, along with a validating signature, at 208 of FIG. 2a.

Once the leader has obtained more than f reports validated by signatures, it compresses them and produces an attested report for transmission to smart contract C. Taking more than f signatures ensures that the attested report has been validated by at least one correct oracle. Note that the attested report is not necessarily unique, even when the leader is correct, since any f+1 correctly signed observations form a valid attested report. Before the attested report is transmitted to smart contract C by executing Algorithm 5 below, the generation module 106 disseminates the report to all oracles.

Algorithm 2, which governs the report generation module follower protocol instance (e,l) (executed by every oracle $p_i$) is set for the below.
   state
   $r_f \leftarrow 0$: current round number within the epoch
   sentecho$\leftarrow \perp$: echoed attested report which has been sent for this round sentreport$\leftarrow$FALSE: indicates if REPORT message has been sent for this round completedround$\leftarrow$FALSE: indicates if current round is finished
   receivedecho$\leftarrow[\text{FALSE}]^n$: jth element true iff received FINAL-ECHO message with valid attested report from $p_j$
   upon receiving message [OBSERVE-REQ,$r^o$] from p·s.t. $r_f < r^o \leq r_{max}+1$ do $r_f \leftarrow r^o$//oracle moves to next round as follower if $r_f > r_{max}$ then//p' has exhausted its maximal number of rounds invoke event changeleader//see report pacemaker protocol in Alg. 1 exit//oracle halts this report generation instance sentecho$\leftarrow\perp$; sentreport$\leftarrow$FALSE; completedround$\leftarrow$FALSE receivedecho$\leftarrow[\text{FALSE}]^n$ v$\leftarrow$current observation of the value oracle reports on (e.g. price)
   $\sigma \leftarrow$
   sign$_i$([OBSERVE,e,r,v])
   send message
   [OBSERVE,r,v,$\sigma$] to p'
   upon receiving message [REPORT-REQ,$r^o$,R] from p·s.t. $r^o = r_f \wedge \neg^{sentreport} \neg \neg$completedround do if verify that R is sorted with entries from 2f+1 distinct oracles $\wedge$verify that all signatures in R are valid then if should-report(R) then
   $R^o$
   $\leftarrow$a $\tau \leftarrow$//validate the report
   sign$_i$([REPORT,e,$r_f$,$R^o$])//the round continues
   sentreport$\leftarrow$TRUE
   send message [REPORT,$r_f$,$R^o$,$\tau$] to p'
   compressed list of the form [(w,k) . . . ] from R= [(w,k,$\sigma$) . . . ]
   else complete-round( )
   upon receiving message [FINAL,$r^o$,O] from p's.t. $r^o=r_f \wedge$sentecho$=\perp$ do if verify-attested-report(O) then sentecho$\leftarrow$O
   send message [FINAL-ECHO,r,O] to all $p_j \in P$
   upon receiving a message [FINAL-ECHO,$r^o$,O] from $p_j$ s.t. $r^o=r_f \wedge \neg$receivedecho[j]$\wedge \neg$completedround do if verify-attested-report(O) then receivedecho[j]$\leftarrow$TRUE if sentecho$=\perp$then sentecho$\leftarrow$O
   send message [FINAL-ECHO,r,O] to all $p_j \in P$
   upon |\{$p_j \in P$|receivedecho[j]=TRUE\}|>f$\wedge \neg$completedround do invoke transmit(sentecho)//see transmission protocol in Alg. 5 complete-round( )

Algorithm 3, which governs report generation module 106 follower protocol, helper functions, instance (e,l) (executed by every $p_i$) is set forth below.
   function
   should-
   report(R)
   //$C_O=(C_e, C_r, C_R, C_J, C_S)$ is the most recent report committed by C, as known to $p_i$
   //let $t_C$ denote the time when C committed $C_O$
   v$\leftarrow$median($C_R$) v$^o \leftarrow$median(R)
   return $(C_e, C_r)=(0,0) \vee (\text{now}-t_C > \Delta_C) \vee (|v-v'|/|v|>\alpha)$//now denotes the current local time at $p_i$
   function complete-round( )//terminates the round in two cases . . . completedround$\leftarrow$TRUE//(1) when no transmit is needed and (2) when transmit has been invoked invoke event progress//see pacemaker protocol in Alg. 1; indicates leader is performing correctly//the round ends and $p_i$ waits until p' initiates the next round
   function verify-attested-report(O)//verify that more than f signatures attest report O
   ',',R, J,T)$\leftarrow$O
   k=1, . . . , f+1
   (
   for do
   if
   $\neg$verify$_{J(k)}$([REPORT,e,$r_f$,R],
   T[
   k]) then return FALSE
   return TRUE Algorithm 4, which governs report generation module protocol instance (e,') (executed by p')
   state
   r'$\leftarrow$0: current round number within the epoch
   observe$\leftarrow[\perp]^n$: signed observations received in OBSERVE messages report
   $\leftarrow[\perp]^n$: attested reports received in REPORT messages timer $T_{round}$ with timeout duration $\Delta_{round}$, initially stopped
   timer $T_{grace}$ with timeout duration $\Delta_{grace}$, initially stopped
   phase$\leftarrow \perp$: denotes phase within round in {OBSERVE, GRACE, REPORT, FINAL}
   upon event startepoch(e,') do start-round( )
   upon timeout from $T_{round}$ do
     start-round( )
   function start-round( )

r'←r'+1//leader protocol moves to next round observe←[⊥]"; report←[⊥]" send message [OBSERVE-REQ,r'] to all $p_j \in P$ start timer $T_{round}$
phase←
OBSERVE
upon receiving message [OBSERVE,$r^0$,w,σ] from $p_j$ s.t. $r^0$=r'∧i='∧observe[j]=⊥∧phase∈{OBSERVE, GRACE} do if verify$_j$([OBSERVE,e,r',w],σ) then observe[j]←(w,σ)
upon |{$p_j \in P$|observe[j]=6 ⊥}|=2f+1 ∧phase=OBSERVE do
start timer $T_{grace}$//
grace period for slow oracles
phase←
GRACE
upon event timeout from $T_{grace}$∧phase=GRACE
do assemble report R
←sorted((w,k,σ) for k,(w,σ) inenumerate(observe))
send message [REPORT-REQ,r',R] to all $p_j \in P$
phase←REPORT
upon receiving message [REPORT,$r^0$,R,τ] from $p_j$ s.t. $r^0$=r'∧i='∧report[j]=⊥∧phase=REPORT do if verify$_j$ ([REPORT,e,r',R],τ) then report[j]←(R,τ)
upon exists R s.t. |{$p_j \in P$|report[j]=(R,')}|> f∧phase=REPORT do k←1
for j∈{1, . . . , n} s.t. report[j]=(R,τ) do//collect the attestation of the final report J[k]←j; T[k]←τ
k
←
k
+
1
O←[e,r',R,J,T]
send message
[FINAL,r;O] to all $p_j \in$
P phase←FINAL To start the dissemination of a report, $p_i$ sends a FINAL message containing the attested report to all oracle nodes, as shown at 210 of FIG. 2b. Once a node receives such a message with a properly attested report, it sends the report again to all nodes in a FINAL-ECHO message, as shown at 212 in FIG. 2b. Alternatively, when a node receives first a FINAL-ECHO message with a properly attested report and has not yet echoed one, then the node sends a FINAL-ECHO message with this report as well. When a node has obtained more than f valid attested reports, it invokes the transmission protocol of transmission module 108 through a transmit event and passes one of the attested reports to Algorithm 5. As noted above, attested reports are not necessarily unique, as an incorrect leader could send different nodes attestations from different size-f subsets of the follower attestations it receives, or an incorrect follower could re-order the attestations it receives from the leader. Note that the amplification of FINAL-ECHO messages ensures that the transmission protocol is either started by all correct oracles or by none, but not necessarily with the same attested report. When timer $T_{round}$ expires, as described in more detail below, a new round is started.

The round may fail due to network delays or when the leader node does not behave correctly. For instance, the leader may not gather enough signatures on the report in time or may fail to send some messages. The report generation protocol instance may then never produce an attested report or cause that only some of the oracles invoke the transmission protocol. Such liveness violations are caught by the calling pacemaker protocol, however, because no progress events are emitted.

The oracle protocol prevents a situation in which a leader runs for more than $r_{max}$ rounds, where $r_{max}$ is a global parameter. This is to prevent a malicious leader from driving the protocol as quickly as possible and causing a denial-of-service attack, for example, through oracles exhausting their computational or network capacity, or by making oracles hit API limits. In particular, when the leader attempts to start any round numbered higher than $r_{max}$, then every oracle exits the report generation protocol after receiving a corresponding OBSERVE-REQ message as a follower. The oracle signals this to the pacemaker protocol with a changeleader event and halts any further processing in this instance.

The function should-report determines whether the oracle should validate the current report and has a dual purpose. First, it prevents coalitions of up to f malicious oracles from spamming smart contract C with transmissions in order to quickly extract reward payouts for useless reports. Second, it enables running rounds in quick succession without spending lots of gas on spurious updates that don't materially change the median exposed by smart contract C. Function should-report assesses if the oracle should participate in producing the report. As mentioned before, this is the case when the value to be reported has changed significantly with respect to value $C_R$ committed by C most recently, enough time has passed since then, or when the report generator has just been initialized for the first time ever and the committed epoch-round tuple is still the initial value $(C_e, C_r)=(0,0)$.

Since the function refers to the current time, it implicitly assumes clock synchronization. However, the duration $\Delta_C$ is a different order of magnitude than expected clock skew, so any split view on whether a report should be transmitted should resolve within an epoch or two. Note that asynchronous periods may also result in a split view among the correct oracles on whether the leader makes enough progress in the pacemaker protocol (Algorithm 1), i.e., when f+1 oracles have faster clocks than the rest of the group including the leader.

Algorithm 5 below can be executed by transmission module 108 to govern transmitting a final report O (produced by Algorithms 2-4) to the smart contract C on blockchain 102 of FIG. 1. The function of Algorithm 5 creates a suitable transaction, such, as an Ethereum transaction when using an Ethereum blockchain, containing final report O. Under ideal conditions, transmission module 108 starts the transmission protocol at roughly the same time across all oracles. To avoid redundant transmissions and reduce gas costs, the algorithm first filters incoming reports. This provides protection against a scenario where many rounds complete in quick succession and produce a large number of similar reports. In such a case, only the first such report should be transmitted, and the following reports should be discarded. To do so, the protocol keeps track of the latest incoming report L and only allow a report O through the filter if (1) C has seen a report at least as recent as L, i.e., there is no backlog of reports, or (2) if O's median observation value deviates sufficiently from the median in L.

Algorithm 5 transmission protocol (oracle $p_i$).
state timer Transmit, initially stopped: delays until next report should be transmitted
reports←heap-new( ): priority queue of time-report pairs (t,O), keyed on ascending time values
L=(Le,Lr,LR,LJ,LS)←⊥: latest report accepted for transmission
CO=(Ce,Cr,CR,CJ,CS): most recent report committed by C, as known to pi upon event transmit(O) do
(O,O,O O
if then//O is outdated compared to CO return
if L=6⊥∧(Oe,Or)≤(Le,Lr) then
return//O is outdated compared to L
if L=⊥∧|median then
L←O
Δtransmit←transmit-delay(i,Oe,Or) insert (now+Δtransmit,O) into reports (t,O)=heap-peek(reports)//recall reports contains (t,O) pairs sorted by ascending t
restart Ttransmit with delay (t−now)
upon event timeout from Ttransmit do if |reports|=0 then
  return
(reports)
(
ifthen
send Ethereum transaction with O to C
if |reports|>0 then
(t,')←heap-peek(reports) restart Ttransmit with delay (t−now)
function transmit-delay(i,e,r)
π←Gx(ekr)//derive pseudo-random permutation over {1, . . . , n} k←k such that//assuming s0=0 return k·Δstage After a report passes the filter of Algorithm 5, the algorithm proceeds in stages and is globally parameterized by a stage duration $\Delta_{stage}$ and a schedule S=($s_1$, . . . , $s_{|S|}$). In stage i, there are $s_i$ distinct and randomly selected oracles that attempt to transmit the report to C. Each oracle is chosen at most once as a transmitter. Furthermore an oracle will transmit O only if the oracle has not yet observed the report on the blockchain, as committed by smart contract C. Stage i starts after duration (i−1)$\Delta_{stage}$ has elapsed. Writing $t_0 = \Sigma_{j=1}^{k} s_j$, this means that, in stage k, the oracles on position $t_{k-1}+1$, . . . , $t_{k-1}+s_k$ of π are supposed to transmit. By requiring that $\Sigma_i$. $s_i$>f, we can ensure that there is at least one correct node that will transmit to smart contract C. The timeouts are such that reports to be transmitted from multiple rounds may overlap substantially, i.e., a report from the subsequent round may arrive before many oracles had a chance to transmit. A realistic setting is n·$\Delta_{stage}$>>$\Delta_{round}$. This is described in greater detail below.

For the transmission protocol effected by transmission module 108 to achieve its goal, a correct oracle must always be able to get a transaction included in the blockchain within $\Delta_{stage}$ time. This assumes that (1) miners are actively mining the blockchain and including transactions from their mempools according to the dynamics and that (2) the oracle appropriately sets (or escalates) its price bid to have the transmission transaction included in the blockchain. These assumptions may be violated in practice, e.g., during times of particularly egregious congestions of the Ethereum blockchain. In such cases, transmission transactions will still be included eventually, but later and possibly at a higher total gas cost.

The selection of transmitting oracles occurs with a pseudo-random function $G_x$: $\{0, 1\}^* \to Sym(n)$, where x is a secret key known only to oracles and Sym(n) is the set of permutations of {1, . . . , n}. Given (at least implicitly) the protocol identifier, epoch, and round, $G_x$ deterministically derives a permutation of the node set. As with the leader function described herein, the secret x should not be known to the oracles before they are committed to their indexing $\{p_1, \ldots, p_n\}$, so that a malicious coalition cannot arrange themselves to dominate the early parts of the schedule. Faulty oracles may misbehave and ignore the global transmission schedule given by the algorithm, e.g., because their clock is malfunctioning or because they wish to earn the higher payment afforded to the first transmitting oracle. (Oracles that observe, but do not transmit, are paid less.) A defense against this behavior can be based on economic incentives. The owner should monitor smart contract C and check that oracles follow the transmission schedule. The owner of smart contract C is expected to remove any oracles that consistently misbehave (i.e., submit too late or too early) from the protocol, preventing them from earning future reporting and transmission fees. Since such an attack threatens neither key safety nor liveness properties, and the ratio between earnings from ongoing protocol participation to earnings from such an attack (prior to discovery) is expected to be high.

Note that all modules and protocols in the disclosed implementations are functional under partial synchrony only to the extent that the timing characteristics of the network after GST are reflected by the chosen constants. Since they are fixed and not determined adaptively with respect to an unknown A, the protocol does not formally adhere to partial synchrony. Below is an example of how many of the constants used in the protocol can be set.

Δ is the upper bound on communication latency during periods of synchrony. The choice of all other time constants is constrained by this. Estimate: 1 second $\Delta_{progress}$ is the duration in which a leader must achieve progress or be replaced. Estimate: 45 seconds $\Delta_{resend}$ is the interval at which nodes resend NEWEPOCH messages. Estimate: 30 seconds $\Delta_{round}$ is the duration after which a new round is started. Estimate: 30 seconds $\Delta_{grace}$ is the duration of the grace period during which delayed oracles can still submit observations. Estimate: 2 seconds $\Delta_C$ limits how often updates are transmitted to the contract as long as the median isn't changing by more then α. Estimate: 5 minutes-24 hours α allows larger changes of the median to be reported immediately, bypassing $\Delta_C$. Estimate: 0.2%-5% (depending on price feed that is being watched)

$\Delta_{stage}$ is used to stagger stages of the transmission protocol. Multiple Ethereum blocks must be mineable in this period. Estimate: 60 seconds-90 seconds $r_{max}$ is the maximum number of rounds in an epoch. Estimate: 3-10 n is the number of oracles. In our initial implementation, we assume n≤31.

All hash and signature computations can use proper domain separators, which are omitted from the above protocol description for notational clarity. Domain separators include:

Protocol identifier
Address of smart contract C
A counter of protocol instances (maintained by smart contract C)
Chain identifier (e.g. for Ethereum mainnet)
Set of oracles P In the protocol of some disclosed implementations, $\Delta_{round}$ controls the frequency at which a correct leader should create reports. However, it might be desirable to produce more frequent reports upon observing significant changes of the reported data stream. Some form of aggregate or threshold signature scheme could be used instead of the vector of ECDSA signatures used in the examples above. The constant (in n) gas costs of signature verification enables support of much larger oracle sets. A new oracle list signed by a quorum of oracles from the current set could be used to change the off-chain oracle set without requiring the owner of contract C to intervene.

The protocol of pacemaker module 104 discussed above is now discussed in more detail. The pacemaker protocol can run continuously. It interacts with its environment by consuming (input) events of type progress and changeleader, by initializing and aborting report generation protocol instances, each identified by a unique (e,l) pair, and by emitting startepoch(e,l) (output) events at the leader.

- initialize a report generation instance (e,l): This indicates that the oracle moves to epoch e and runs the corresponding report generation instance with oracle/as leader. At most one report generation protocol instance is initialized for a particular (e,l).
- abort a report generation instance (e,l): Stops the running protocol instance identified by epoch e and leader l.
- startepoch(e,l): Indicates at oracle p' that the oracle should start epoch e as leader. This occurs only after the report generation instance (e,l) has been initialized by p'.
- progress: Originates from the current report generation protocol instance and indicates that the leader has made adequate progress, according to the oracle's local view and clock.
- changeleader Originates also from the current report generation protocol instance and indicates that this instance has reached its maximal number of rounds; therefore, the oracle should advance to the next epoch with a new leader.

Furthermore, the protocol of pacemaker module 104 internally uses a timer $T_{progress}$ with duration $\Delta_{progress}$ that captures the assumption that every report generation protocol instance should repeatedly emit progress or changeleader events that are no more than $\Delta_{progress}$ apart. Since the report generation protocol is driven by a leader oracle p', we say that the oracle "times out on p" when no progress or changeleader event occurs between two successive timeouts from $T_{progress}$. A pacemaker protocol has the following properties:

- Eventual succession: If more than f correct oracles have initialized some epoch e with leader p' during a period of network synchrony after GST and subsequently either time out on p' or receive a changeleader event, then all correct oracles will advance to epoch e+1 after at most $2\Delta_{resend}+2\Delta+4\epsilon$.
- Putsch resistance: A correct oracle does not abort the current epoch and initialize a new epoch unless at least one correct oracle has timed out on the leader of the current epoch or the report generation protocol has indicated to change the leader.
- Eventual agreement: Eventually, every correct oracle has initialized the same epoch e with leader p' and does not abort it unless some correct oracle times out or indicates a leader change.

Algorithm 1, and how it implements the pacemaker module protocol, is now discussed in more detail. First, a number of lemmas (i.e., intermediate theorems) are formulated. Lemma 1 characterizes how the correct oracles progress to subsequent epochs. Notice this holds also for asynchronous periods. Assume that the maximal epoch that has been initialized by any correct oracle is $\bar{e}$ and let ne denote the maximal value of variable ne at any correct oracle. Then, if no correct oracle times out and epoch $\bar{e}$ does not indicate a leader change at any correct oracle, then no correct oracle broadcasts [NEWEPOCH, e'] with e'>ne; $\bar{e} \leq \overline{ne} \leq \bar{e}+1$.

Recall the role of variable ne in Algorithm 1, which records the highest epoch for which the oracle has ever broadcast a NEWEPOCH message, and that ne is at least the current epoch value e for correct oracles. To prove claim (a), note that an oracle with current epoch $\bar{e}$ can only advance $\overline{ne}$ to e+1 independently, i.e., without receiving any NEWEPOCH messages, through the "leader is too slow, or "tenure is over" handler. However, this is ruled out by the assumption of the lemma. Therefore, the only way for a correct node to increase ne beyond $\overline{ne}$ is via the "NEWEPOCH amplification rule." This triggers when the oracle receives [NEWEPOCH,e'] messages with e'>ne from more than f oracles.

We now establish an infinite descent to obtain a contradiction. Suppose that a correct oracle has current epoch to $\bar{e}$ and its "NEWEPOCH amplification rule' is triggered, so that ne becomes greater than $\overline{ne}$. Since there are at most f faulty oracles, but more than f[NEWEPOCH,e'] messages with e'>ne have been received, at least one other correct oracle has sent [NEWEPOCH,e']. Hence, this oracle's ne variable is also greater than $\overline{ne}$. This leads us back to the supposition at the start of this paragraph, with a different correct oracle. We continue this argument by induction and observe that ne>$\overline{ne}$ implies there are infinitely many distinct, correct oracles. However, the set of oracles is finite and ne≤$\overline{ne}$ for all of them. Therefore, all correct oracles will correspondingly broadcast [NEWEPOCH,e'] with e'≤ne.

To establish claim (b), suppose towards a contradiction that $\overline{ne} \geq e+2$. It follows from the above argument that at least one correct oracle has sent a NEWEPOCH message containing epoch $\bar{e}=e+2$ or higher, through the "NEWEPOCH amplification rule." However, this oracle has set ne to e+1 from its variable e according to the algorithm. But $\bar{e}$ is the maximum epoch value e of any correct oracle and therefore $e+1=ne=\overline{ne} \geq e+2 \geq e+2$, a contradiction. It follows that $\overline{ne}$ is at most e+1.

The partially synchronous system model postulates a global stabilization time (GST), after which no more crashes occur, clocks are synchronized, and every message between two correct oracles is delivered within $\Delta$. Suppose that the local processing time of any correct oracle after receiving messages is at most E; this includes receiving multiple messages concurrently, i.e., is an upper bound on the processing latency of all messages and local events between receiving and sending messages over the network. This value is negligible compared to the other durations under consideration. The next lemma establishes a condition for reaching agreement after GST, in the sense that all correct oracles initialize the same epoch and remain in this epoch long enough.

For Lemma 2, consider an epoch e such that no correct oracle has initialized any higher epoch than e. If some correct oracle has initialized e before GST, then define a point in time $\tau$ to be GST; otherwise, let $\tau$ be the time when the first correct oracle initializes e. Let $\overline{ne}$ denote the maximal value of variable ne at any correct oracle at time $\tau$. If e=$\overline{ne}$, no correct oracle times out, and epoch e does not indicate a leader change at any correct oracle during at least $\Delta_{agree}=2\Delta_{resend}+2\Delta+4\epsilon$ after $\tau$, then all correct oracles have initialized epoch e at time $\tau+\Delta_{agree}$ and do not abort it afterwards unless epoch e indicates a leader change.

Notice that the local epochs and the highest epochs (stored in e and ne, respectively) of the correct oracles may differ because of crashes. In particular, correct oracles that have recovered may have missed arbitrarily many messages. Let $p_i$ be the oracle that has initialized epoch e according to the assumption. It has received more than 2f NEWEPOCH messages containing an epoch value of at least e. More than f of those messages were sent by correct oracles. Even if these nodes had crashed, they meanwhile recovered, restored their e and ne variables to their highest values before the crash, and operate correctly from now on. Thus, more than f correct nodes retransmit NEWEPOCH messages with an epoch value of at least e at most $\Delta_{resend}$+after $\tau$.

Thus, after at most $\Delta_{resend}+\Delta+2\epsilon$, every correct oracle has received and processed more than f NEWEPOCH messages containing an epoch value of at least e. According to the algorithm and the "NEWEPOCH amplification rule," since epoch values of at least e are reported more than f times, every correct oracle broadcasts a NEWEPOCH message containing epoch e or higher after no more than $2\Delta_{resend}+\Delta+3\epsilon$.

These messages are received by all correct oracles after at most $2\Delta_{resend}+2\Delta+4\epsilon=\Delta_{agree}$. Therefore, every correct oracle has received n−f>2f NEWEPOCH messages with epoch at least e and has initialized epoch e after $\Delta_{agree}$. Lemma 1(a) implies that no oracle initializes a higher epoch afterwards, until epoch e indicates a − leader change. Notice that the previous lemma only bounds the time after GST for reaching agreement on a particular epoch e when e=$\overline{ne}$. If some correct nodes have initialized epoch e at GST and $\overline{ne}$=e+1, which is the only alternative to this condition according to Lemma 1, it means that that variable ne of at least one correct oracle is equal to ne. The situation may remain like this for an unbounded period. But once the faulty oracles cause a correct oracle to initialize epoch ne by sending NEWEPOCH messages with parameters at least ne, the condition of the lemma applies again and bounds the time that the correct oracles need for progressing to epoch ne. We can summarize this behavior less precisely in the following lemma. For the third Lemma, we assume there exists a point in time after GST, after which every correct oracle has initialized the same epoch e and does not abort it unless some correct oracle times out or an indicates a leader change for epoch e.

For Lemma 4, consider a period of network synchrony after GST. If more than f correct oracles are in epoch e with leader $p_i$ and either time out on $p_i$ or receive a changeleader event, then all correct oracles will advance to epoch e+1 after at most $2\Delta_{resend}+2\Delta+4\epsilon$. Notice that when a correct oracle times out on p or receives a changeleader event during epoch e, it sets ne=e+1. Thus, the proof of Lemma 2 applies for this situation as well because more than f correct oracles send NEWEPOCH messages with e+1. Hence, all correct oracles have initialized epoch e+1 after at most $2\Delta_{resend}+2\Delta+4\epsilon$.

As Lemma 5, assume a correct oracle does not abort an epoch e unless at least one correct oracle has timed out on the leader of epoch e or the report generation protocol has indicated to change the leader. Notice that $\overline{ne}$ in Lemma 1 is the maximal epoch value that any correct oracle has ever sent in a NEWEPOCH message. Assume that e is the highest epoch initialized by any correct oracle, hence we have $\overline{ne}$=e. Towards a contradiction, suppose that some correct oracle has aborted epoch e. According to the algorithm, this means it has received NEWEPOCH messages for some epoch higher than e from more than 2f oracles, of which some were sent by correct oracles. But by Lemma 1(a) with $\overline{ne}$=e, no correct oracle has sent a NEWEPOCH message with an epoch higher than e under the assumptions of putsch resistance. The lemma follows. The statements of Lemmas 3-5 imply all properties of a pacemaker protocol. Therefore, the following result summarizes our analysis.

As noted above, the protocol of report generation module 106 is parameterized by an epoch number e and a leader oracle $p_l$. The protocol receives a startepoch(e,l) event (only at the leader; the parameters e and l are redundant). It generates one or more transmit(O) events at all oracles, where O denotes an attested report to be transmitted; we say that the oracle starts transmission at this point and the report is taken up by the transmission protocol. Moreover, the report generation protocol at every oracle periodically emits a progress event and thereby signals that it makes progress to pacemaker module 104. The report generation protocol may also produce at most one changeleader event, indicating that the report generation protocol has ended; this occurs after transmitting $r_{max}$ attested reports. Messages of the protocol include those set forth below.

startepoch(e,l): Instructs the oracle $p_l$ to start epoch e as leader.

progress: Indicates that the report generation protocol instance has made progress, in the sense that the leader $p_l$ has collected one round of observations from the oracles.

changeleader: Indicates that the report generation protocol terminates because it has performed the maximum foreseen number of observation collections and possible transmissions.

transmit(O): The report generation protocol has generated an attested report O and starts transmission with O.

Furthermore, every oracle running the protocol has access to a constantly changing observation value v; we assume this is read into variable v immediately before the code accesses this value. We say that an oracle "observes" value v when this occurs. An oracle $p_i$ may consult the most recent attested report $C_O$, which contains the oracle report $C_R$ committed most recently by C. Notice that due to dissemination delays, not every oracle receives updates to $C_O$ at the same time. In the following, we refer to this $C_R$ as the "committed" report that $p_i$ knows.

Internally, the leader of the report generation protocol uses two timers, $T_{round}$ and $T_{grace}$. They are used to refine the above properties during synchronous periods. Time $T_{round}$ runs continuously with duration $\Delta_{round}$ and controls the periodic start of a new report generation round. Timer $T_{grace}$ is active during the grace period for $\Delta_{grace}$ and controls the extra waiting time for receiving observations into the current report from late oracles. When an oracle $p_i$ receives a report R containing observations from 2f+1 oracles, the oracle checks if R should be reported with respect to the committed report $C_R$ and the current time, as specified by function should-report(R) in Algorithm 2. In the following, let $\Delta^+=\Delta_{grace}+6\Delta+8\epsilon$.

A report generation protocol satisfies these conditions:

Transmission totality: If at some point in time after GST a correct oracle starts transmission with an attested report O=(e,r,R, . . . ) and the report generation protocol instance is not aborted, then every correct oracle starts transmission with an attested report O'=(e',r',R', . . . ) such that (e,r)=(e,r) within at most $2\Delta+2\epsilon$.

Observation integrity: If a correct oracle starts transmission of an attested report with median v, then v is either the observation of a correct oracle or lies between the observations of two correct oracles.

Responsiveness: Consider a point in time after GST when the network has synchronized and every correct oracle knows some committed report $C_R$ and suppose $p_l$ is correct. If every correct oracle observes a value that should be reported and the epoch is not aborted, then every correct oracle starts transmission within at most $\Delta_{round}+\Delta^+$.

Progress: Suppose p is correct and that the report generation protocol is not aborted. Consider the point in time after GST, when all correct oracles have initialized the report generation protocol. Then, every correct oracle indicates that it makes progress or started a transmission once in the interval $[\rho(\Delta_{round}+\epsilon), \rho(\Delta_{round}+\epsilon)+\Delta^+]$ for $\rho=1, \ldots, r_{max}-1$. Furthermore, every correct oracle indicates to change the leader once in the interval $[r_{max}(\Delta_{round}+\epsilon), r_{max}(\Delta_{round}+\epsilon)+\Delta^+]$.

Timely inclusion: Consider a point in time after GST when the network has synchronized and suppose some correct oracle $p_i$ observes a value v that should be reported. If the leader is correct and $\Delta+2\epsilon \le \Delta_{grace}$, then the attested report in the next transmission started by $p_i$ contains v reported by $p_i$.

Bounded leader tenure: No correct oracle starts transmission in this report generation protocol more than $r_{max}$ times.

Now, a proof that Algorithm 2-4 implements a report generation protocol is developed. For the 7$^{th}$ Lemma, consider a point in time after GST and suppose a correct oracle starts transmission in a round r. Then every correct oracle starts transmission in round r within at most $2\Delta+2\epsilon$ or the report generation protocol instance is aborted. As a proof, suppose the correct oracle $p_i$ has started transmission in round r and that the report generation instance is not aborted. Then it has received properly attested reports, as determined by verify-attested-report, from more than f distinct other oracles. Since the verification function does not depend on local state, every other correct oracle also recognizes such an attested report as properly attested. Notice at least one of the oracles that sent a properly attested report to $p_i$ is correct, hence, it has sent a FINAL-ECHO message containing this attested report O to all nodes. At most $\Delta+\epsilon$ later, every correct node therefore has received O or has already received some properly attested report earlier. This means that every correct node sends a FINAL-ECHO with O in response or has sent some attested report in such a message earlier. Thus, at the latest after $2\Delta 2\epsilon$, every correct oracle has received n−f>f FINAL-ECHO messages with possibly different, but always valid, attested reports and has started to transmit a report.

As the eights Lemma, assume the median observation value in an attested report as determined by verifyattested-report is either the observation of a correct oracle or lies between the observations of two correct oracles. Recall that an attested report R contains a (compressed) list of 2f+1 observations. Since R has been attested, there is at least one correct oracle $p_j$ that has validated and signed R. During the report validation earlier, $p_j$ has verified that every observation in R has been signed by a distinct oracle. Since the report contains 2f+1 observations, strictly more than half of the values in R represent observations by correct oracles. Hence, the median value of an attested report is either an observation of a correct oracle or it is from a faulty oracle, but R contains a smaller and a larger observation, both from correct oracles.

As Lemma 9, consider a point in time after GST when the oracle network has synchronized and every correct oracle knows some committed report $C_R$ and suppose p' is correct. If every correct oracle observes a value that should be reported and the epoch is not aborted, then every correct oracle starts transmission within at most $\Delta round+\Delta grace+6\Delta+8\epsilon$. Notice that under the conditions of the lemma, a fresh round is started by the correct leader at most after $\Delta_{round}$. Every correct oracle sends its observation to $p_l$, and $p_l$ combines these to a report R. According to Lemma 8, the median observation value in R is the observation of a correct oracle or lies between the observations of two correct oracles. Hence, testing if the median value of R should be reported ensures that when all correct oracles observe values to be reported, then the test succeeds. For the rest of the argument, follow the algorithm as driven by the correct leader. Then the additional maximal delays after $\Delta_{round}$ until a correct oracle transmits the report are as follows:

1) $\epsilon+\Delta$ for $p_l$ to start the round and send the OBSERVE-REQ message until every correct oracle receives it;
2) $\epsilon+\Delta$ for every correct oracle to respond with a OBSERVE message to $p_l$.
3) $\epsilon+\Delta_{grace}$ for the leader to process all OBSERVE-REQ messages and to wait during the grace period;
4) $\epsilon+\Delta$ for $p_l$ to finish the grace period and to send a REPORT-REQ message to all oracles until every correct oracle receives this;
5) $\epsilon+\Delta$ for every correct oracle to respond with a REPORT message to $p_l$;
6) $\epsilon+\Delta$ for $p_l$ to produce a FINAL message and until every correct oracle receives it;
7) $\epsilon+\Delta$ for every correct oracle respond to the FINAL message with a FINAL-ECHO message and until every correct oracle receives f+1 of these; and
8) for every correct node to process the FINAL-ECHO messages and start transmission.

The precondition of the previous lemma can be generalized in the sense that not all correct oracles may locally know the same report $C_R$. In particular, each one might know a potentially different committed report from C, but still such that the report value R in REPORT-REQ should be reported compared to the committed report. Then the conclusion of the lemma follows as well. Last, but not least, recall from the implementation of should-report(R) that to check whether R should be reported, the time that has elapsed since the latest known committed report was produced and moment of checking counts as well.

As Lemma 10, suppose p' is correct and that the report generation protocol is not aborted. Consider the point in time after GST, when all correct oracles have started the report generation protocol, and let $\Delta^+=\Delta_{grace}+6\Delta+8\epsilon$. Then, every correct oracle has indicated that it makes progress or started a transmission once in the interval $[\rho(\Delta_{round}+\epsilon), \rho(\Delta_{round}+\epsilon)+\Delta^+]$ for $\rho=1, \ldots, r_{max}-1$. Furthermore, every correct oracle indicates to change the leader once in the interval $[r_{max}(\Delta_{round}+\epsilon), r_{max}(\Delta_{round}+\epsilon)+\Delta^+]$. The proof of Lemma 9 above shows that the duration of a round at each correct oracle is at most $\Delta^+=\Delta_{grace}+6\Delta+8\epsilon$, measured from the time when the leader starts it. Since clocks are synchronized and messages are not delayed by more than $\Delta$ after GST, $p_l$ starts round number $\rho$ with a delay of $\rho(\Delta_{round}+\epsilon)$ after starting the report generation protocol. According to the protocol and using similar reasoning as in the proof above, every correct oracle then indicates either progress or a leader change at most $\Delta^+$ after the leader starts the round.

As Lemma 11, consider a point in time when the network has synchronized and suppose some correct oracle $p_i$ observes a value v that should be reported. If the leader is correct and $\Delta+\epsilon \le \Delta_{grace}$, then the attested report in the next transmission started by any correct oracle contains v reported by $p_i$. Considering that this property is only guaranteed after GST, the inclusion follows directly from the implementation of the grace period: The leader waits at least for $\Delta_{grace}$ until it assembles the report R for a round. This allows correct oracle $p_i$ to include its observation in R, which takes up to $\Delta+2\epsilon$ for preparing and sending the OBSERVE message and for processing this by $p_l$.

As Lemma 12, assume that no correct oracle starts transmission in this report generation protocol more than $r_{max}$ times. This property follows directly from the protocol, since every correct oracle $p_i$ counts the number of rounds in a local integer variable r. In particular, $p_i$ initializes r to 0 and subsequently verifies that when an OBSERVE-REQ message arrives and the leader announces a new round, any change to r only increments r. Furthermore, $p_i$ halts the report generation when $p_l$ attempts to start a round with number greater than $r_{max}$.

Note that Lemmas 7-12 correspond to the definition of a report generation protocol. Therefore, the following result holds. There is one single instance of the transmission protocol that uses two events. The protocol is defined with respect to synchronous time. A transmit(O) event may be invoked on the transmission protocol to receive an attested report O for transmission. The algorithm performs various checks and if these succeed, it sends a transaction containing O on the Ethereum network to C. More formally, we consider two events.

- transmit(O): Receives an attested report O for transmission.
- send transaction with O: Sends a Ethereum transaction to C with O.

Every oracle $p_i$ locally receives a sequence of reports for transmission, where each report is identified by a unique epoch-round tuple according to the implementation of report generation. When the properties below refer to an order among reports, this always corresponds to the order given by these epoch-round tuples. For reports received for transmission, this order is the same as the order of the transmission events, according to the properties of the report generation protocol in combination with the pacemaker. However, not every correct oracle receives the same sequence of reports for transmission. The transmission protocol internally buffers every report and sends a corresponding transaction only after a predetermined delay. The protocol also has access to the most recently committed report by C on the blockchain, which is denoted by $C_O$.

A transmission protocol satisfies for each oracle $p_i$:

Liveness: When $p_i$ receives a report O for transmission and either the median observation in O differs sufficiently from the observation in the most recently buffered report L or $C_O$ is already more recent than L, then $p_i$ buffers O. Furthermore, for every buffered report O, an Ethereum transaction is sent after a predetermined delay, unless $C_O$ has meanwhile become more recent than O.

Safety: No Ethereum transaction is sent with a report O unless O has been received for transmission.

Algorithm 5 executes a transmission protocol of transmission module 108. The liveness and the safety properties follow directly from the implementation. The delay before the reports received for transmission are sent in transactions to smart contract C and the total cost incurred by the transactions executed by smart contract C on the blockchain. Here we deviate from the model of the adaptive adversary, and instead we assume the adversary chooses which oracles to compromise before the secret key x for the pseudorandom delay function becomes known to the oracles and the adversary. Recall that Algorithm 5 operates in stages according to a schedule and buffers reports for multiples of a predetermined time $\Delta_{stage}$. For convenience, we define $s_{1\ldots j} = \Sigma_{i=1}^{j} s_i$. If none of the f faulty oracles ever sends a transaction, we have:

P[transmission takes longer than $k \cdot \Delta_{stage}$]= P[no successful transmission in $$1..k] = \begin{cases} \dfrac{f!(n-s_{1..k})!}{(f-s_{1..k})!n!} \\ 0 \end{cases}$$

stages $s_{1\ldots k} \leq f$

Let c be the cost of the first transaction sent to smart contract C on Ethereum and let c' be the cost of subsequent transactions that fail. In expectation, the cost of a given schedule is:

$$E[\text{transmission cost}] = (c - c') + \sum_{i=1}^{|S|} P[\text{no successful transmission in stages } 1..i-1] s_i c'.$$

Disclosed implementations leverage an off-chain oracle network and corresponding protocol to reduce the likelihood of damage from rogue oracles acting in concert. Periodically, the oracles, jointly and in concert, run the protocol to sign a report containing observations from many of the oracles in the network. The report is transmitted to a smart contract C running on a DLT. The smart contract C can validate the report, pay each oracle that contributed an observation to the report and expose the median, or other calculated value, of the reported values to consuming smart contracts on-chain. The protocol is resilient to different kinds of failures.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed:

1. A method for providing secure information to a decentralized computing environment, the method comprising:
    executing a smart contract on plural on-chain nodes of the decentralized computing environment, wherein the smart contract specifies a network of plural oracle nodes of an off-chain computing network and wherein the oracle nodes each have a collection of keys that define an identity of the corresponding node;
    periodically receiving, by each oracle node, a respective value corresponding to the secure information;
    wherein the oracle nodes communicate with each other and with the smart contract using a protocol that defines the following three protocol modules;
    a report generation module configured to gather the respective values from each oracle node and, when specified security conditions are met, generate a signed report listing the respective values;
    a pacemaker module configured to periodically initiate a new epoch that triggers an instance of the report generation module; and
    a transmission module configured to selectively transmit, to the smart contract, the signed report generated by each of multiple instances the report generation module, wherein signed reports to be transmitted are selected based on timing of the generation of the reports and a state of the smart contract;
    determining, by the smart contract, a mathematical aggregation of the values in each report transmitted in accordance with the transmission; and
    exposing by the smart contract, the aggregation of the values to consuming smart contracts executing on the decentralized computing environment.

2. The method of claim 1, wherein the report generation module executes the following process:

receiving a startepoch event from the pacemaker module at a leader oracle node that is selected from the oracle nodes;

initiating a new instance of a report generation protocol;

the oracle nodes observing progress events to create observations;

the leader oracle requesting the observations from the other oracle nodes;

upon expiration of a predetermined time, the leader oracle node collating the observations, sorting the observations by observation value, and sending the sorted observations to the other oracle nodes in a report request message;

at least some of the oracle nodes verifying and signing the sorted observations;

the leader oracle node broadcasting a report to each of the other oracle nodes; and at least a threshold number of the other oracle nodes verify the report.

3. The method of claim 2, wherein the report generation module executes in multiple consecutive instances and wherein the pacemaker module periodically selects an oracle node to be the leader oracle node and emits a startepoch event that is sent to the leader oracle node and wherein, in response to the startepoch event, the leader oracle node starts a new instance of the report generation protocol.

4. The method of claim 2, wherein the threshold number of oracle nodes is determined by one of the following equations:

$$\lambda = 2f+1 \quad (a)$$

$$\lambda > (n+f)/2 \quad (b)$$

$$\lambda = n-f \quad (c)$$

Where;
$\lambda$ is the threshold number,
n is the total number of oracle nodes, and
f is the maximum number of oracle nodes that may be faulty at a specific time.

5. The method of claim 1, wherein the mathematical aggregation is a calculated median of the values.

6. The method of claim 4, wherein a new startepoch event is emitted and sent to a new leader oracle module node when a sufficient number of oracles nodes have determined that a new leader oracle node is needed.

7. The method of claim 1, wherein the networks of plural oracle nodes satisfies the following equation:

$$n=3f+1$$

where n is the number of oracle nodes and f is the number of oracle nodes that are deemed faulty at a specific time.

8. The method of claim 3, wherein the network of plural oracle nodes is a private computer network that, for each instance of the report generation protocol, operates in an asynchronous manner up to a global stabilization time (GST) and thereafter behaves synchronously and all messages between correct nodes of the oracle nodes are delivered within a predefined delay time.

9. The method of claim 2, wherein each of the oracle nodes receives the startepoch event.

10. A computing system for providing secure information to a decentralized computing environment, the system comprising:

a plurality of computer processors; and at least one memory coupled to the computing processors and storing computer-readable instructions which, when executed by the plurality of computing processors, processors, causes the plurality of computing processors to accomplish the following steps;

executing a smart contract on plural on-chain nodes of the decentralized computing environment, wherein the smart contract specifies a network of plural oracle nodes of an off-chain computing network and wherein the oracle nodes each have a collection of keys that define an identity of the corresponding node;

periodically receiving, by each oracle node, a respective value corresponding to the secure information;

wherein the oracle nodes communicate with each other and with the smart contract using a protocol that defines the following three protocol modules:

a report generation module configured to gather the respective values from each oracle node and, when specified security conditions are met, generate a signed report listing the respective values;

a pacemaker module configured to periodically initiate a new epoch that triggers an instance of the report generation module; and a transmission module configured to selectively transmit, to the smart contract, the signed report generated by each of multiple instances the report generation module, wherein signed reports to be transmitted are selected based on timing of the generation of the reports and a state of the smart contract;

determining, by the smart contract, a mathematical aggregation of the values in each report transmitted in accordance with the transmission; and exposing by the smart contract, the aggregation of the values to consuming smart contracts executing on the decentralized computing environment.

11. The system of claim 10, wherein the report generation module executes the following process:

receiving a startepoch event from the pacemaker module at a leader oracle node that is selected from the oracle nodes;

initiating a new instance of a report generation protocol;

the oracle nodes observing progress events to create observations;

the leader oracle requesting the observations from the other oracle nodes;

upon expiration of a predetermined time, the leader oracle node collating the observations, sorting the observations by observation value, and sending the sorted observations to the other oracle nodes in a report request message;

at least some of the oracle nodes verifying and signing the sorted observations;

the leader oracle node broadcasting a report to each of the other oracle nodes; and at least a threshold number of the other oracle nodes verify the report.

12. The system of claim 11, wherein the report generation module executes in multiple consecutive instances and wherein the pacemaker module periodically selects an oracle node to be the leader oracle node and emits a startepoch event that is sent to the leader oracle node and wherein, in response to the startepoch event, the leader oracle node starts a new instance of the report generation protocol.

13. The system of claim 2, wherein the threshold number of oracle nodes is determined by one of the following equations:

$$\lambda = 2f+1 \quad \text{(a)}$$

$$\lambda > (n+f)/2 \quad \text{(b)}$$

$$\lambda = n-f \quad \text{(c)}$$

Where;
- $\lambda$ is the threshold number,
- n is the total number of oracle nodes, and
- f is the maximum number of oracle nodes that may be faulty at a specific time.

14. The system of claim 10, wherein the mathematical aggregation is a calculated median of the values.

15. The system of claim 13, wherein a new startepoch event is emitted and sent to a new leader oracle module node when a sufficient number of oracles nodes have determined that a new leader oracle node is needed.

16. The system of claim 10, wherein the networks of plural oracle nodes satisfies the following equation:

$$n = 3f+1$$

where n is the number of oracle nodes and f is the number of oracle nodes that are deemed faulty at a specific time.

17. The system of claim 12, wherein the network of plural oracle nodes is a private computer network that, for each instance of the report generation protocol, operates in an asynchronous manner up to a global stabilization time (GST) and thereafter behaves synchronously and all messages between correct nodes of the oracle nodes are delivered within a predefined delay time.

18. The system of claim 11, wherein each of the oracle nodes receives the startepoch event.

* * * * *